US012728678B2

(12) United States Patent
Bigi et al.

(10) Patent No.: US 12,728,678 B2
(45) Date of Patent: Sep. 8, 2026

(54) TYRE CHANGING MACHINE AND METHOD FOR USING A TYRE CHANGING MACHINE

(71) Applicant: NEXION S.P.A., Correggio (IT)

(72) Inventors: Mirco Bigi, Carpi (IT); Daniele Aldini, Correggio (IT)

(73) Assignee: NEXION S.P.A., Correggio (IT)

(*) Notice: Subject to any disclaimer, the term of this patent is extended or adjusted under 35 U.S.C. 154(b) by 315 days.

(21) Appl. No.: 18/461,379

(22) Filed: Sep. 5, 2023

(65) Prior Publication Data

US 2024/0075774 A1 Mar. 7, 2024

(30) Foreign Application Priority Data

Sep. 6, 2022 (IT) ........................ 102022000018168

(51) Int. Cl.
*B60C 25/138* (2006.01)

(52) U.S. Cl.
CPC .................................. *B60C 25/138* (2013.01)

(58) Field of Classification Search
CPC . B60C 25/0521; B60C 25/0572; B60C 25/12; B60C 25/125; B60C 25/13; B60C 25/138
See application file for complete search history.

(56) References Cited

U.S. PATENT DOCUMENTS 5,215,138 A 6/1993 Toriselli
8,347,934 B1 1/2013 Cunningham
11,148,482 B2 * 10/2021 Sotgiu ................. B60C 25/0521
2012/0291960 A1 11/2012 Bonacini
2014/0311682 A1 10/2014 Bonacini
(Continued)

FOREIGN PATENT DOCUMENTS

CN 201366914 Y 12/2009
EP 0512595 A1 11/1992
(Continued)

OTHER PUBLICATIONS

Search Report for Italian Patent Application No. 102022000018168, Date of Completion: Apr. 6, 2023, along with Written Opinion, 7 pages.
(Continued)

*Primary Examiner* — David B. Thomas
(74) *Attorney, Agent, or Firm* — CHRISMAN GALLO TOCHTROP

(57) ABSTRACT

A tyre changing machine (100) for mounting and demounting a tyre (P) to and from a corresponding rim (C) of a vehicle wheel (R) comprises a wheel-holder unit (200), a frame (400) and a bead breaker unit (300) including an abutment surface (S) and a bead breaking arm (301) articulated to the frame (400) to rotate about a second vertical axis (Y). The bead breaker unit (300) comprises: a bead breaker tool (302) mounted on the bead breaking arm (301), a bead breaker actuator (303), connected to the bead breaking arm (301) to move the bead breaker tool (302) towards and away from the abutment surface (S), and a driving element (304), mounted on the bead breaking arm (301) and configured to drive the bead breaker actuator (303), the driving element (304) alternately adopting an advanced position, a return position and an intermediate position.

20 Claims, 5 Drawing Sheets

(56) References Cited

U.S. PATENT DOCUMENTS

| | | | | |
|---|---|---|---|---|
| 2015/0273960 | A1* | 10/2015 | Dressler | B60C 25/0521 157/1.24 |
| 2016/0263953 | A1 | 9/2016 | Dressler | |
| 2018/0354320 | A1 | 12/2018 | Sotgiu | |
| 2018/0370302 | A1 | 12/2018 | Sotgiu | |
| 2024/0075773 | A1* | 3/2024 | Bigi | B60C 25/0521 |

FOREIGN PATENT DOCUMENTS

| | | | |
|---|---|---|---|
| EP | 1048496 | A1 | 11/2000 |
| EP | 2514613 | A1 | 10/2012 |
| EP | 2796302 | A1 | 10/2014 |
| EP | 2927028 | A1 | 10/2015 |
| EP | 2930038 | B1 | 12/2016 |
| EP | 2524819 | B1 | 7/2017 |
| WO | 2017081554 | A1 | 5/2017 |

OTHER PUBLICATIONS

Search Report for Italian Patent Application No. 102022000018174, Date of Completion: Apr. 3, 2023, along with Written Opinion, 6 pages.

* cited by examiner

100
T
400
Y
301a
304c
W
301
301b
Z1
302
Z2
502a
503a
502
S
400b
400c
X
200
400a
700
503
501
502a
301
305
308
303a'
303
306
303a
303b
303a'
400b
600
S

TYRE CHANGING MACHINE AND METHOD FOR USING A TYRE CHANGING MACHINE

This invention relates to a tyre changing machine for mounting and demounting a tyre to and from a corresponding vehicle wheel rim.

This invention also relates to a method for using a tyre changing machine.

As is known, before being able to remove a tyre completely from the respective rim, the tyre beads must be detached and released from the groove in the rim.

This is done, in the prior art, using machines equipped with bead breaker units comprising an arm mounted on a horizontal support structure of the machine.

More specifically, the arm has a first end that is hinged to one side of the machine's support structure and a second end that is provided with a bead breaker tool, also called "blade", configured to detach the tyre bead from the rim.

As is known, the arm is driven by a pneumatic or hydraulic cylinder to move the bead breaker tool between an operating position, where it is moved in a direction towards the tyre to engage the tyre and detach the bead from it, and an end-of-stroke position, where it is moved in the opposite direction, away from the tyre to allow the wheel to be positioned.

In prior art machines, the cylinder is driven using one or more pedal controls located at the front of the support structure. This position, however, is particularly inconvenient. In effect, during the bead breaking operation, the operator has to press the pedals while, at the same time, holding a handgrip attached to the blade with one hand.

To overcome this drawback, the cylinder, in some prior art bead breaker tools, is driven by a control lever mounted on the arm.

In this situation, an operator operatively holding the control lever with one hand, can drive the arm in order to move the tool from the operating position to the end-of-stroke position and vice versa. Examples of such bead breaker units are known from U.S. Pat. No. 8,347,934 and EP2524819B1.

Although this solution overcomes the inconvenience of having to use the control pedal, it does not provide a particularly versatile or precise machine. Indeed, in some prior art machines, the control lever simply makes it possible to operate a valve that opens and closes a pneumatic circuit to power the cylinder in such a way that it moves the arm and the bead breaker tool from the end-of-stroke position to the operating position and vice versa. In this situation, during bead breaking (that is to say, when the bead breaker tool is at the operating position), the tyre bead breaks free of the rim suddenly and all at once when the force applied by the bead breaker tool exceeds a threshold value.

The moment it breaks free, the bead stops opposing the forward motion of the bead breaker tool almost instantly, making it difficult for the operator to hold the control lever to stop the arm from continuing to move forward and to then move it back in the opposite direction. In this situation, after the bead has broken free, there is a high risk of not being able to stop the arm and of causing serious damage to the tyre and/or to the rim.

Although some bead breaker units known in the prior art, as described, for example, in EP2930038B1, overcome this problem by means of an elastic mechanism which stops the bead breaker tool when the bead breaks free, even these units have inherent disadvantages.

In particular, every time a bead is detached, the arm must be moved back to the end-of-stroke position so that another wheel with a tyre to be demounted can be positioned. Disadvantageously, that means that even when bead breaking needs to be carried out on a narrower wheel which could be positioned between the support structure and the bead breaker tool without moving the arm to the end-of-stroke position, the arm must in any case be moved back to that position.

In other words, in prior art tyre changing machines, if the wheel that necessitates bead breaking is narrower than the largest wheel the machine can handle, it would still be necessary to move the arm to the end-of-stroke position, thus increasing the total time required for bead breaking operations.

Other known solutions for tyre changing machines are provided in patent documents EP2796302A1, EP2927028A1, WO2017/081554A1 and EP0512595A1. However, the need remains for a tyre changing machine which allows the user to detach the tyre bead of the wheels (keeping the wheel on the ground) in a particularly efficient and rapid way.

The technical purpose of this invention, therefore, is to provide a tyre changing machine and a method for using a tyre changing machine to overcome the above mentioned disadvantages of the prior art.

This invention thus has for an aim to provide a machine that allows the operator to effectively control the bead breaking process.

Another aim of this invention is to provide a machine that is fast, easy to use and efficient.

Another aim of this invention is to provide a machine that is particularly ergonomic.

Yet another aim of this invention is to provide a simple and efficient method for using a tyre changing machine.

The technical purpose indicated and the aims specified are substantially achieved by a tyre changing machine and a method for using a tyre changing machine comprising the technical features described in one or more of the accompanying claims. The dependent claims correspond to possible embodiments of the invention.

More specifically, the technical purpose and preset aims are achieved by a tyre changing machine for mounting and demounting a tyre to and from a corresponding vehicle wheel rim.

The tyre changing machine comprises a working head provided at least with a tool configured to facilitate mounting the tyre to the rim.

The tyre changing machine also comprises a wheel-holder unit rotatable about a first vertical axis of rotation and configured to support the wheel rim from which or to which a respective tyre is to be demounted or mounted.

In a possible embodiment, the wheel-holder unit is provided with a supporting plate to which the rim is fixed while the tyre is being removed or mounted using the working head.

More in detail, the wheel rim is anchored to the supporting plate in such a way that the central axis of the wheel coincides with the first axis of rotation.

In this situation, the working head is disposed above the wheel and can be moved towards and away from it so as to operate on the wheel.

The tyre changing machine also comprises a frame which rests on a floor and which has a front portion and a flank.

In the embodiment illustrated, the frame has the shape of a box on which the wheel-holder unit and the working head are mounted.

The machine also comprises a bead breaker unit mounted on the flank of the frame and connected thereto. The bead breaker unit includes an abutment surface configured to receive the wheel with the tyre tread resting on a supporting surface at floor level and one sidewall in contact with the abutment surface.

The term "supporting surface" may be used to denote the floor itself or a supporting platform configured to lift the wheel towards the supporting plate after a tyre bead has been detached, as described in detail below.

In the embodiment illustrated, the abutment surface is applied to a lateral portion of the frame and is covered with a material, for example, rubber, capable of preventing damage to the wheel rim in contact with it. The abutment surface may also be textured, as shown in the accompanying drawings, to prevent the sidewall of the wheel from slipping when it is in contact with the abutment surface.

The bead breaker unit also comprises a bead breaking arm articulated to the frame to rotate about a second vertical axis.

The bead breaking arm comprises a first end, articulated to the frame, specifically to the lateral portion of the frame, and a second end.

The bead breaker unit also comprises a paddle shaped bead breaker tool mounted on the bead breaking arm.

More in detail, the bead breaker tool is mounted on the second end of the bead breaking arm.

The bead breaking arm is movable between end positions; in particular, the breaking arm is movable between a first end position, wherein the bead breaker tool is proximal to the abutment surface (i.e., wherein the bead breaker tool is at a minimum distance with respect to the abutment surface), and a second end position, distal from the abutment surface (i.e., wherein the bead breaker tool is at a maximum distance with respect to the abutment surface).

According to an aspect of the disclosure, the bead breaker tool is configured to rotate about a vertical adjustment axis, that is, an axis parallel to the first axis of rotation and to the second axis of rotation.

In this situation, the bead breaker tool is coupled to the second end of the bead breaking arm so it can rotate about the vertical adjustment axis. This aspect is particularly advantageous in that it allows varying the inclination of the bead breaker tool. In use, once the inclination has been decided, the bead breaker tool can be fixed in position, using a pin, for example. In this situation, the bead breaking arm is provided with (at least two) holes in which the pin can be inserted so as to stop the bead breaker tool from rotating at the desired inclination.

Alternatively or in addition to the adjustment described above, the bead breaker tool is configured to rotate about a horizontal adjustment axis, that is, an axis perpendicular to the vertical adjustment axis.

In this situation, the bead breaker tool is coupled to the second end of the bead breaking arm so it can rotate about the horizontal adjustment axis. This aspect is particularly advantageous in that it allows adjusting the position of the bead breaker tool based on the diameter of the wheel from whose rim the tyre is to be removed.

The tyre changing machine also comprises a bead breaker actuator connected to the bead breaking arm to move the bead breaker tool towards and away from the abutment surface, so as to detach the tyre bead from an annular edge of the rim of the wheel that is in contact with the abutment surface. Thus, when the bead breaker tool moves towards the abutment surface, the bead breaking arm moves towards the first end position; when the bead breaker tool moves away from the abutment surface, the bead breaking arm moves towards the second end position.

The bead breaker actuator is connected to the bead breaking arm at a point between the first and the second end of the bead breaking arm so as to move the bead breaker tool towards or away from the abutment surface.

Looking in more detail, the bead breaker actuator has a first portion connected at a first connecting point inside the frame, and a second portion, connected to the bead breaking arm at a second connecting point.

In this situation, the bead breaker actuator protrudes from the frame and extends towards the bead breaking arm.

The second connecting point is adjustable so as to define a plurality of connection configurations, corresponding to a plurality of maximum distances between the second connecting point and the first connecting point.

In other words, by adjusting the second connecting point, the maximum distance between the second connecting point and the first connecting point of the bead breaker actuator varies, as does the angle swept by the bead breaking arm when it moves the bead breaker tool.

In an example embodiment of the bead breaker actuator, the first connecting point is located inside the (box defining the) frame, so the stem protrudes from the frame through a suitable hole.

In an example embodiment, the bead breaker actuator includes (a rod which in turn includes) a stem and a tubular body fixed to the stem. For example, the stem protrudes from the frame and the tubular body is connected to the bead breaking arm. The tubular body is fixed to the stem to form the rod. In other words, the stem and the tubular body form a single body, where the tubular body can be likened to an extension of the stem.

In an example embodiment, the length of the rod can be varied by increasing or decreasing a portion of rod inserted in the tubular body. In addition or alternatively, the distance between the first and the second connecting point can be varied by varying the position of the second connecting point along the rod (as in the example embodiment illustrated in the drawings). For example, if the rod includes the tubular body, the second connecting point can be moved along the tubular body. In this embodiment, the second connecting point is defined by the interconnection between the tubular body and a receiving block made on the bead breaking arm.

Looking in more detail, the tubular body has a plurality of seats, aligned along the length of the bead breaker actuator.

Each seat is configured to receive an adjustment element so as to adjust the second connecting point.

In the embodiment illustrated, the adjustment element comprises a coupling pin, configured to define different positions of the second connecting point relative to the first connecting point.

In this situation, the tubular body can be inserted into the receiving block, which is also provided with a seat that is configured to receive the adjustment element.

More in detail, the tubular body is inserted into the receiving block in such a way that one of the seats of the tubular body is aligned with the seat of the receiving block so the adjustment element can be inserted through the aligned seats.

Depending on which seat of the tubular body is selected for inserting the adjustment element (that is, depending on which seat of the tubular body is aligned with the seat of the receiving block), the maximum distance between the first and the second connecting point differs so that the movement of the bead breaking arm can be adapted based on the size of the wheel whose rim must have the tyre removed from it.

More in detail, by adjusting the second connecting point (by inserting the adjustment element into a predetermined seat), it is possible to vary the maximum distance of the first point from the second point, that is to say, to vary the angle swept by the bead breaking arm during its movement. In this situation, therefore, it is possible to adapt the position reachable by the bead breaking arm based on the size of the wheel whose tyre needs to be removed so as to reduce the total time required for bead breaking.

In use, therefore, by inserting the adjustment element into a seat of the tubular body, it is possible to set a limit stop to the movement of the bead breaker actuator, thereby setting a distance of the second connecting point from the first connecting point.

The adjustment element is thus useful to switch the bead breaker actuator from one connection configuration to another connection configuration.

Advantageously, the fact that the distance between the connecting points can be adjusted means that the machine can handle a wider range of tyre sizes without using excessively long cylinders.

In use, therefore, to detach the tyre bead from a wheel rim, the wheel is placed in such a way that its sidewall is in contact with the abutment surface and the tyre tread rests on the supporting surface.

Next, the adjustment element is positioned to define a predetermined connection configuration, that is to say, in such a way as to define the maximum distance reachable by the second connecting point relative to the first connecting point.

After that, the bead breaker actuator is activated so as to set the bead breaking arm in rotation about the second axis of rotation, that is, about the first end of the bead breaking arm itself, thus bringing the bead breaker tool towards the abutment surface. In this situation, the bead breaker tool comes into contact with the tyre and is inserted at least partly between the tyre and the corresponding rim so as to detach the tyre bead from the annular edge of the wheel rim.

In a preferred embodiment, to prevent the bead breaking arm from interfering with the tyre, the bead breaking arm comprises a first stretch extending along a substantially horizontal axis and a second stretch that is connected to the first stretch and substantially perpendicular to the first stretch.

More specifically, the second stretch and the first stretch of the bead breaking arm make an angle with each other such that when the bead breaker tool is moved close to the wheel to perform bead breaking, the wheel is inside a concavity or arcuate portion defined by the first and the second stretch without interfering with the bead breaking arm.

Following the action of the bead breaker tool, the bead breaking arm is moved away, the wheel is rotated about its axis and the bead breaking arm is moved closer to it again so that the bead breaker tool can operate on another point to detach (another part of) the bead. The to-and-fro movement of the bead breaker tool is repeated until the bead is completely free of the annular edge of the rim.

When bead breaking is over, the bead breaker actuator is activated one last time to set the bead breaking arm in rotation about the second axis of rotation, that is, about the first end of the bead breaking arm itself, thus moving the bead breaker tool away from the abutment surface to allow the wheel to be loaded onto the wheel-holder unit.

To drive the bead breaker actuator, the tyre changing machine comprises a driving element mounted on the bead breaking arm.

Advantageously, the fact that the driving element of the bead breaker actuator is mounted directly on the bead breaking arm allows the operator to control the movement of the bead breaker tool towards/away from the bead breaking arm in a simple, uncomplicated manner without losing control of the advancing movement and thereby preventing damage to the tyre and/or to the rim.

The driving element alternately adopts an advance position, where it drives the bead breaker tool to move the bead breaker tool towards the abutment surface, and a return position, where it drives the bead breaker actuator to move the bead breaker tool away from the abutment surface.

The driving element is also configured to adopt an intermediate position, where it stops driving the bead breaker actuator in order to hold the bead breaking arm still.

In the embodiment illustrated, the driving element is a control means grippable by an operator to control the bead breaker actuator so as to advance the bead breaker tool towards the wheel, to move the bead breaker tool away from the wheel and to hold the bead breaker tool at the intermediate position.

In the preferred embodiment, the driving element is rotatable about an axis of rotation in a first direction, corresponding to the advance position, and in a second direction, opposite of the first direction, corresponding to the return position.

In a possible embodiment, the driving element comprises a handle, a ring, a knob or the like, which can be rotated about a corresponding axis of rotation.

In the preferred embodiment, the driving element comprises a handle grippable by the operator, and a control ring at one end of the handle along the axis of rotation and rotatable in the first and second directions in such a way as to move the bead breaker tool.

In the embodiment illustrated, the axis of rotation is horizontal.

In the preferred embodiment illustrated, the driving element also comprises a supporting rod extending from the bead breaking arm and configured to support the handle and the control ring in such a way as to keep them at a height from the floor that is ergonomically convenient for use by the operator.

The tyre changing machine also comprises an elastic return mechanism operating on the driving element to elastically return it to the intermediate position.

In other words, when the driving element (rotated in the first or the second direction) is released, that is to say, when the operator lets go of the driving element, the elastic return element takes the driving element back to the intermediate position so it stops driving the bead breaker actuator and holds the bead breaking arm at the current position.

In use, therefore, an operator holds the driving element with one hand and rotates it in the first direction. In this situation, the bead breaker actuator is driven to rotate the bead breaking arm about the first end so as to bring the bead breaker tool towards the wheel.

In the embodiment illustrated, the operator grips the handle and rotates the control ring in the first direction.

When the bead breaker tool has securely engaged the wheel, the operator lets go of the handle which, thanks to the elastic return mechanism, moves to the intermediate position. In this situation, the bead breaker actuator is in a stand-by condition to keep the bead breaking arm, hence the bead breaker tool, at the position reached.

When the bead is detached, the operator rotates the driving element in the second direction, opposite of the first direction. In the embodiment illustrated, the operator grips the handle and rotates the control ring in the second direction.

In this situation, the bead breaker actuator is made to rotate the bead breaking arm about the first end so as to move the bead breaker tool away from the wheel to allow another wheel to be put in its place or to allow the same wheel to be repositioned so that the bead breaker tool can act on another point of the tyre to detach the bead completely.

During this movement, too, the driving element can be released and, thanks to the elastic return element, moves to the intermediate position. In this situation, the bead breaker actuator is in a stand-by condition to keep the bead breaking arm, hence the bead breaker tool, at the position they had reached when the operator released the driving element.

The fact that the driving element can be released so that the bead breaking arm, hence the bead breaker tool, remains at the current position is particularly advantageous especially when the bead breaker actuator is driven to move the bead breaker tool away from the wheel.

In particular, the fact that the driving element can be released so the bead breaking arm remains at any intermediate position between the closed position, where the bead breaker tool operates on it, and the open position, where the bead breaker tool has reached its maximum end of stroke (that is, the second connecting point is at its maximum distance away from the first connecting point) allows wheels of different sizes to be handled by the same machine quickly and easily.

Also, since the bead breaker tool is already substantially at the right position, the machine performs bead breaking more quickly, whether it has to operate on the same wheel (at another point of the bead) or whether it has to operate on another wheel that is the same size as the previous one. Indeed, the fact that the bead breaking arm remains at the position it occupied when the driving element was moved to the intermediate position and holds that position until the driving element is rotated again, means that every time the bead has to be detached, the bead breaker tool does not need to be moved away to the maximum distance from the abutment surface allowed by the bead breaker actuator.

More in detail, for wheels smaller than the maximum size that the tyre changing machine can handle, the fact that the bead breaking arm can be released at any intermediate position means that when the wheel on which bead breaking is to be performed needs to be positioned or when it needs to be removed after bead breaking has been completed, the bead breaker tool does not necessarily have to be fully opened to its maximum distance from the wheel allowed by the bead breaker actuator, and that in turn means that bead breaking times are reduced.

For example, if the wheel whose tyre needs to be removed is relatively small in size and such that it can be placed against the abutment surface even without moving the bead breaker tool to the maximum distance from it, the driving element can be used to position and hold the bead breaker tool at a position where it is not fully open (that is, at an intermediate position) while still allowing the wheel to be positioned.

It is observed that, when the actuation element is in the intermediate position, it keeps the bead breaking arm stationary (an locked) in the current position of the bead breaking arm (i.e. the position in which the bead breaking arm is at the instant in which the actuation element is positioned in the intermediate position); the current position can be any position between the end positions of the bead breaking arm (generally speaking, the current position is intermediate between the end positions).

For example, the bead breaker actuator is controlled by a five-way valve with three positions corresponding, respectively, to the advance position, the return position and the intermediate position of the driving element.

Preferably, the valve is positioned inside the frame. In a possible embodiment, the valve is connected to the handle by hoses so as to obtain a pneumatic drive system.

Alternatively, the valve is connected to the handle in such a way as to obtain a mechanical or electrical drive system.

The tyre changing machine also comprises a lifting device including a lifting arm.

As shown in the accompanying drawings, the lifting arm is movable in a plane parallel to the abutment surface.

The lifting device comprises a supporting platform defining a horizontal surface on which to rest the wheel.

In the embodiment illustrated, the supporting platform is made in the form of a rigid table provided with at least one guiding portion adapted to define a ramp to make it easier to roll the wheel into position on it.

Preferably, the supporting platform has two guiding portions extending transversely to the abutment surface so as to make it easier to load the wheel onto it (by rolling) from either side of the supporting platform.

Alternatively, the supporting platform might comprise a plurality of rollers, each having an axis of rotation perpendicular to the abutment surface.

Advantageously, the rollers make it easier for the wheel to rotate about its axis when it is rotated to allow the bead breaker tool to act on different points of the tyre bead to detach the bead completely.

The supporting platform is connected to the lifting arm and is movable between a lowered position, where it can receive the wheel to be lifted off the floor, and a raised position, where it is lifted to make it easier to place the wheel on the wheel-holder unit.

According to an aspect of this disclosure, the supporting platform is hinged to a first end of the lifting arm to rotate about the first end itself.

Looking in more detail, the lifting device comprises a connecting rod configured to define, together with the lifting arm, a four-bar linkage for keeping the supporting platform parallel to the floor while it is moving from the lowered position to the raised position and vice versa. In this situation, when the wheel is lifted, there is no risk of the supporting platform tilting and the wheel falling off.

The bead breaker unit also comprises a lifting actuator connected to the lifting arm to move the supporting platform between the raised position and the lowered position.

In the embodiment illustrated in the accompanying drawings, the lifting actuator is connected to the lifting arm at a hinge point interposed between the first end and a second end of the lifting arm. In this situation, the lifting arm is pivoted about the hinge point.

In the embodiment illustrated, the lifting actuator is at least partly positioned in a compartment defined by a box-shaped body operatively coupled to the flank of the frame and having a lateral wall that defines the abutment surface. In this situation, the lifting arm protrudes from one side of the box-shaped body oriented transversely to the abutment surface. More specifically, the lifting arm protrudes towards a zone in front of the front portion of the frame.

According to an aspect of the disclosure, the tyre changing machine also comprises a plurality of control means configured to lift/lower the supporting platform and to set the wheel-holder unit in rotation.

In the embodiment illustrated, the control means are embodied in the form of pedals protruding from the front portion of the frame.

At least one of the pedals is configured for activating the lifting actuator for lowering or for lifting.

In a possible embodiment, one pedal is configured for activating the lifting actuator for lowering, while another pedal is configured for activating the lifting actuator for lifting.

Alternatively, the same pedal might be used to activate the lifting actuator for both lowering and lifting.

The plurality of pedals might also comprise a pedal for driving the wheel-holder unit in rotation.

Alternatively, instead of the pedals, there might, for example, be a control button on the machine for generating a wireless command by which, for example, the wheel-holder unit is set in rotation.

In use, therefore, to lift the wheel towards the wheel-holder unit, an operator places the wheel on the supporting platform and moves to the front of the frame. Next, the operator operates one of the control means to activate the lifting actuator. In this situation, the lifting actuator is configured to position the lifting arm substantially parallel to the floor. In this situation, the wheel placed on the supporting platform is tipped towards the wheel-holder unit with the aid of the guiding portion.

This disclosure also relates to a method for using a tyre changing machine.

The method comprises a step of providing a tyre changing machine for mounting and demounting a tyre to and from a corresponding vehicle wheel rim.

The tyre changing machine comprises a wheel-holder unit rotatable about a first vertical axis of rotation and configured to support the wheel rim from which or to which a respective tyre is to be demounted or mounted.

The machine also comprises a frame having a front portion and a flank (or lateral portion).

According to an aspect of this disclosure, the tyre changing machine comprises a bead breaker unit mounted on the flank of the frame and configured to cause the tyre bead to be detached from an annular edge of the wheel rim.

To detach the bead, the wheel is positioned in such a way that the tyre tread rests on the floor and one sidewall of the wheel is in contact with an abutment surface.

In an embodiment, the abutment surface is made directly on a side portion of the frame.

In another possible embodiment, the tyre changing machine comprises a box-shaped body operatively coupled to the flank of the frame and having a wall that defines the abutment surface. In this situation, the box-shaped body may be connected to the frame removably or fixedly.

The bead breaker unit also comprises a bead breaking arm that is articulated to the frame to rotate about a second vertical axis. More specifically, the bead breaking arm has a first end that is articulated to the frame and a second end to which a paddle shaped bead breaker tool mounted on the second end of the bead breaking arm is operatively connected.

The bead breaking arm rotates in a plane parallel to the floor so as to move the bead breaker tool towards and away from the wheel in order to detach the tyre bead from the rim.

The bead breaker unit also comprises a bead breaker actuator connected to the bead breaking arm to move the bead breaker tool towards and away from the abutment surface.

The bead breaker actuator has a first connecting point, where it is connected to the frame, and a second connecting point that is adjustable so as to define a plurality of connection configurations of the bead breaker actuator, corresponding to a plurality of maximum distances between the second connecting point and the first connecting point.

In the embodiment illustrated in the accompanying drawings, the bead breaker actuator has a rod that is interconnected between the first connecting point (on the frame, for example, inside the frame) and the second connecting point (on the bead breaking arm). The rod may comprise a stem and a tubular body fixed to the stem to define an extension of the stem and interconnectable with the bead breaking arm.

In the embodiment illustrated, the second connecting point is defined by the interconnection between the tubular body and a receiving block made on the bead breaking arm.

For example, the tubular body has a plurality of seats, aligned along the length of the bead breaker actuator.

Each seat is configured to receive an adjustment element so as to adjust the maximum distance reachable by the second connecting point relative to the first connecting point.

In this situation, the tubular body is also provided with a seat that is configured to receive the adjustment element.

For example, the tubular body is inserted into the receiving block in such a way that one seat of the tubular body is aligned with the seat of the receiving block so the adjustment element can be inserted through the aligned seats.

In this situation, the method thus comprises a step of connecting the second end of the bead breaker actuator to define a connection configuration corresponding to a maximum distance of the second connecting point from the first connecting point. During the step of connecting, the tubular body is inserted into the receiving block so that one of the seats of the tubular body is aligned with the seat of the receiving block.

Next, the adjustment element is inserted into the aligned seats so as to interconnect the tubular body inside the receiving block to define an "interval of the distance" traversable by the second connecting point relative to the first connecting point.

If this interval needs to be varied, the method comprises a step of switching the bead breaker actuator from one connection configuration to another by means of the adjustment element. Depending on which seat of the tubular body is aligned with the seat of the receiving block, the maximum distance between the first and the second connecting point differs so that the movement of the bead breaking arm can be adapted based on the size of the wheel whose rim must have the tyre removed from it.

Following adjustment of the bead breaker actuator, the method comprises a step of positioning the wheel whose rim must have the tyre removed from it. During this step, the wheel is positioned in such a way that the sidewall of the tyre is in contact with the abutment surface and the tyre tread is resting on the supporting surface.

The bead breaker unit also comprises a driving element connected to the bead breaking arm and configured to drive the bead breaker actuator.

In this situation, the method comprises a step of positioning the driving element at an advance position, where it drives the bead breaker tool to move the bead breaker tool towards the abutment surface.

In the preferred embodiment, the driving element is rotatable about a horizontal axis of rotation. In this embodiment, the driving element comprises a handle grippable by the operator, and a control ring at one end of the handle. In this situation, the method comprises a step of rotating the control ring about an axis of rotation in a first direction corresponding to the advance position.

By so doing, the bead breaking arm rotates about the first end to move the bead breaker tool up against the tyre.

The method then comprises a step of detaching the bead of the wheel tyre from the annular edge of the wheel rim using the bead breaker tool.

Next, the method comprises a step of positioning the driving element at a return position, where it drives the bead breaker actuator to move the bead breaker tool away from the abutment surface. In this situation, the method comprises a step of rotating the control ring about the axis of rotation in a second direction corresponding to the return position.

To fully break the bead, the step of detaching the bead of the wheel tyre from the annular edge of the wheel rim using the bead breaker tool is repeated on several angularly spaced portions until the entire bead is detached all the way around.

In practice, once part of the bead has been detached, the wheel is turned about its axis and the step of detaching it using the bead breaker tool is repeated.

According to an aspect of this disclosure, the driving element is also configured to adopt an intermediate position, where it stops driving the bead breaker actuator in order to hold the bead breaking arm still.

More in detail, the driving element at the intermediate position allows keeping the bead breaker actuator on standby so as to hold the bead breaking arm at the position it currently occupies. In this situation, the method comprises a step of positioning the driving element at the intermediate position. This step may be performed either while the bead breaking arm is moving the bead breaker tool towards the wheel, or while it is moving the bead breaker tool away from the wheel.

Advantageously, the fact that the bead breaking arm remains in position when the driving element is moved to the intermediate position and holds that position until the driving element is rotated again, means that every time the bead has to be detached, the bead breaker tool does not need to be moved away to the maximum distance from the abutment surface allowed by the bead breaker actuator. This makes bead breaking quicker and easier. Moreover, the fact that the bead breaking arm remains at the position it occupied when the driving element was moved to the intermediate position and holds that position until the driving element is rotated again, means that the bead breaker tool is prevented from uncontrolledly continuing to move when the bead breaks free of the rim, which in turn means preventing damage to the tyre and/or to the rim.

Another advantage is derived from the structure of the driving element, especially in the case where it comprises the handle and the control ring. In effect, in this situation, the driving element is particularly ergonomic and easy to grip and move.

In a possible embodiment, the tyre changing machine also comprises a lifting device including a lifting arm and a supporting platform defining a horizontal surface on which to rest the wheel.

The supporting platform is connected to the lifting arm and is movable between a lowered position, where it can receive the wheel to be lifted off the floor, and a raised position, where it is lifted to make it easier to place the wheel on the wheel-holder unit.

The lifting device also comprises a lifting actuator connected to the lifting arm to move the supporting platform between the raised position and the lowered position.

In the preferred embodiment, the lifting actuator is at least partly positioned in a compartment defined by the box-shaped body.

In this situation, during the step of bead breaking, the supporting platform is at the lowered position and the sidewall of the wheel is preferably in contact with the abutment surface.

In a possible embodiment, the wheel may have the tyre tread resting entirely on the supporting platform. Alternatively, the wheel may have the tyre tread resting on the floor. In the latter case, when bead breaking has been completed, the method comprises a step of moving the wheel onto the supporting platform so it can be carried towards the wheel-holder unit.

When the bead breaker tool has completed the step of bead breaking, the method comprises a step of lifting the wheel by loading the wheel onto the supporting platform at the lowered position and then lifting the supporting platform.

In this step, the supporting platform is movable along a plane parallel to the abutment surface and is held parallel to the floor by, for example, a connecting rod which is configured to define a four-bar linkage in conjunction with the lifting arm.

In this situation, the wheel is moved near the wheel-holder unit and tipped onto the supporting plate so it can be driven in rotation to complete the removal of the tyre from the rim.

In the preferred embodiment, the tyre changing machine comprises a plurality of control means and the method comprises a step, performed by at least one control means, of activating the lifting actuator for lifting lift or for lowering, and a step, performed by a control means, of activating the wheel-holder unit to set it in rotation.

Advantageously, the method is particularly effective and easy to implement. Advantageously, the method allows not only detaching the bead from the rim but also carrying the wheel quickly up to the wheel-holder unit.

Further features and advantages of this invention are more apparent in the exemplary, hence non-limiting, description of an embodiment of a tyre changing machine and of a method for using a tyre changing machine.

The description is set out below with reference to the accompanying drawings which are provided solely for purposes of illustration without limiting the scope of the invention and in which.

Figure 1:
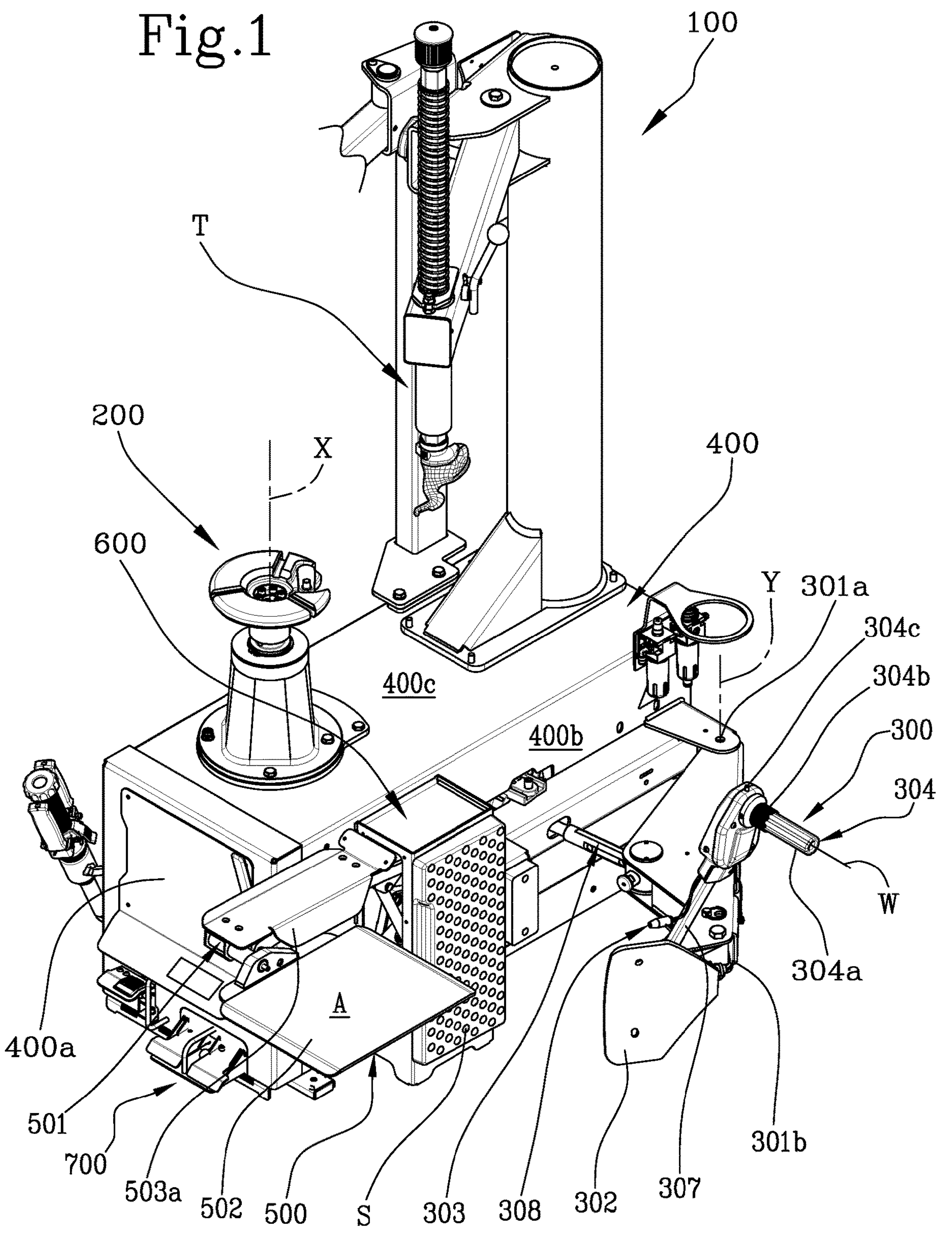
FIG. 1 shows a perspective view of the tyre changing machine of this disclosure with the bead breaker tool at a position away from the abutment surface.

With reference to the accompanying drawings, the numeral 100 denotes a tyre changing machine comprising a wheel-holder unit 200 rotatable about a first vertical axis of rotation X and configured to support the wheel rim C from which or to which a respective tyre P is to be demounted or mounted.

In the embodiment illustrated, the wheel-holder unit 200 is provided with a supporting plate to which the rim C is fixed while the tyre is being removed or mounted.

The tyre changing machine 100 also comprises a frame 400 which rests on a floor and which has a front portion 400*a* and a flank 400*b*.

In the embodiment illustrated, the frame 400 has the shape of a box from whose top wall 400*c* the wheel-holder unit 200 protrudes.

The tyre changing machine 100 also comprises a bead breaker unit 300 mounted on the flank 400*b* of the frame 400 and including an abutment surface S configured to receive the wheel R with the tread B resting on a supporting surface A at floor level and a sidewall abutted against the abutment surface S.

The term "supporting surface" may be used to denote the floor itself or a supporting platform 502 configured to lift the wheel R towards the wheel-holder unit 200, as described in detail below.

The bead breaker unit 300 also comprises a bead breaking arm 301 articulated to the frame 400 to rotate about a second vertical axis Y, parallel to the first vertical axis X.

The bead breaking arm 301 comprises a first end 301*a* that is articulated to the frame 400, in particular to the flank 400*b* thereof, and a second end 301*b*.

The bead breaker unit 300 also comprises a (e.g. paddle shaped) bead breaker tool 302 mounted on the bead breaking arm 300.

More in detail, the bead breaker tool 302 is mounted on the second end 301*b* of the bead breaking arm 300.

Figure 2B:
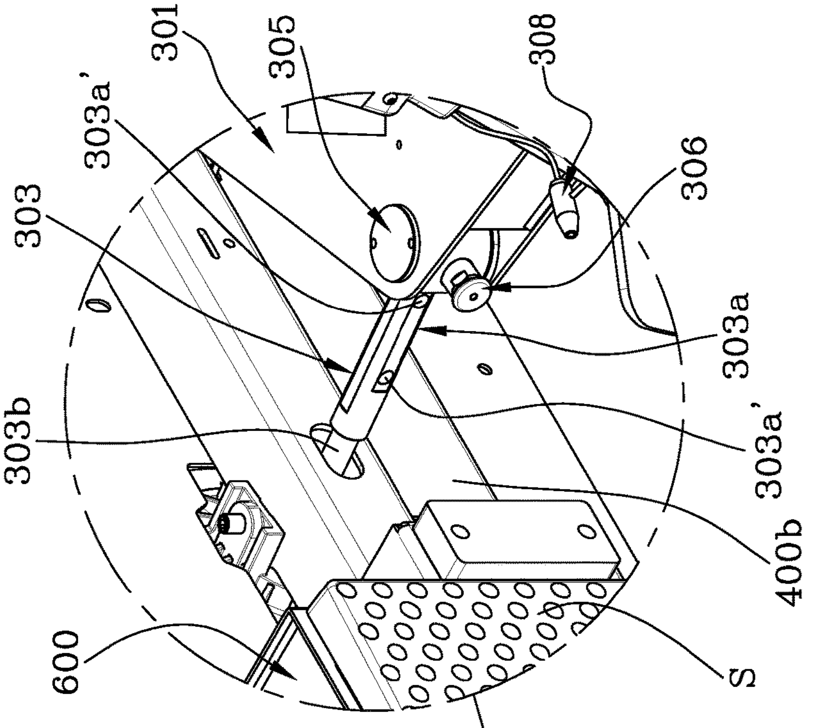
FIG. 2B shows a detail from FIG. 2A.
Figure 2A:
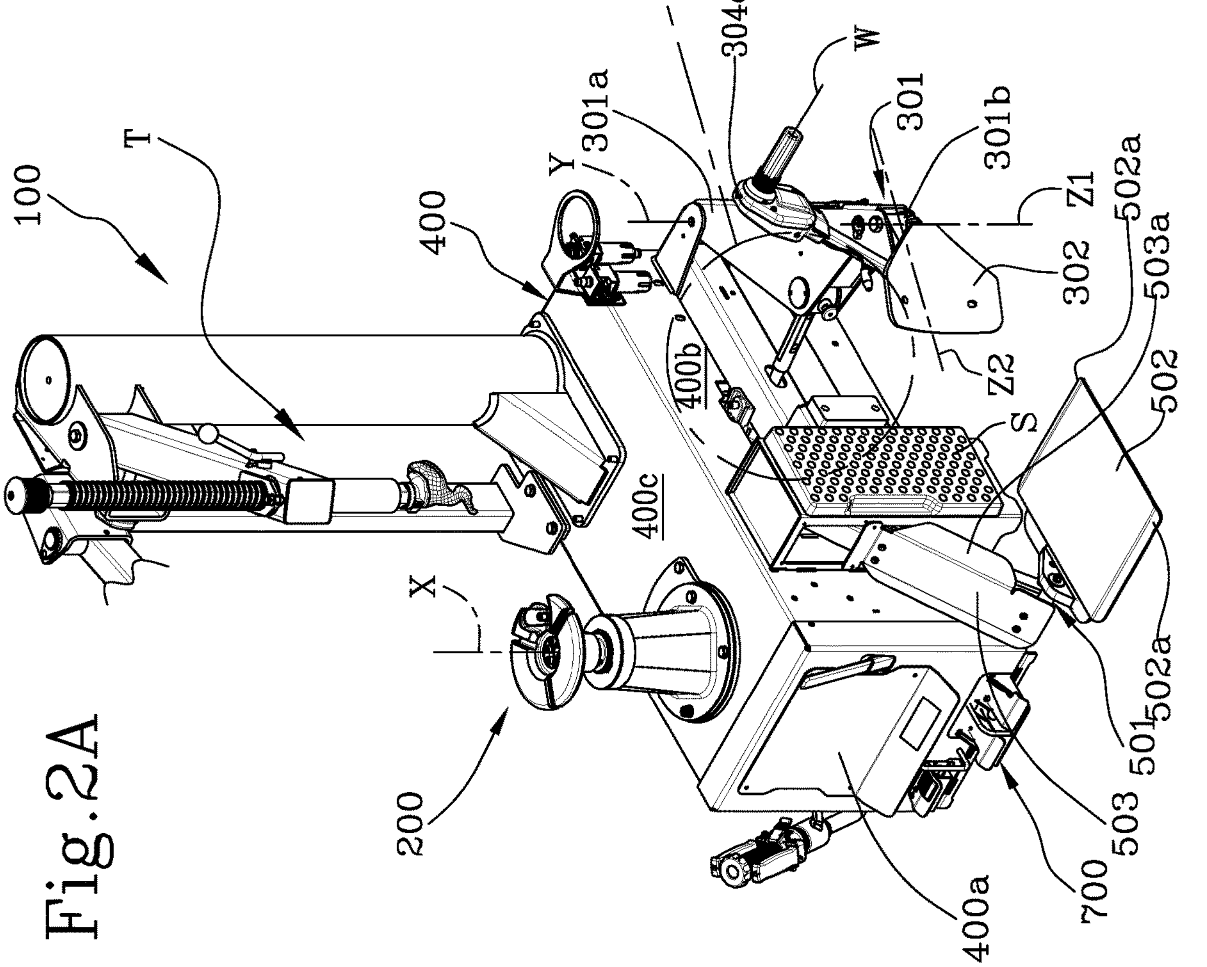
FIG. 2A shows a perspective view of the tyre changing machine with the supporting platform at a lowered position.

The bead breaker tool 302 is configured to rotate about a vertical adjustment axis Z1, that is, an axis parallel to the first axis of rotation X (FIG. 2A).

In this situation, the bead breaker tool 302 is coupled to the second end 301*b* of the bead breaking arm 301 so it can rotate about the vertical adjustment axis Z1. This aspect is particularly advantageous in that it allows adjusting the position of the bead breaker tool 302 based on the width of the wheel R from whose rim C the tyre P is to be removed.

Alternatively or in addition to the adjustment described above, the bead breaker tool 302 is configured to rotate about a horizontal adjustment axis Z2, that is, an axis perpendicular to the vertical adjustment axis Z1 (FIG. 2A).

In this situation, the bead breaker tool 302 is coupled to the second end 301*b* of the bead breaking arm 301 so it can rotate about the horizontal adjustment axis Z2. This aspect is particularly advantageous in that it allows adjusting the position of the bead breaker tool 302 based on the diameter of the wheel R from whose rim C the tyre P is to be removed.

The tyre changing machine 100 also comprises a bead breaker actuator 303 connected to the bead breaking arm 301 to move the bead breaker tool 302 towards and away from the abutment surface S, so as to detach the bead of the tyre P from an annular edge of the rim C of the wheel R that is in contact with the abutment surface S.

Figure 3A:
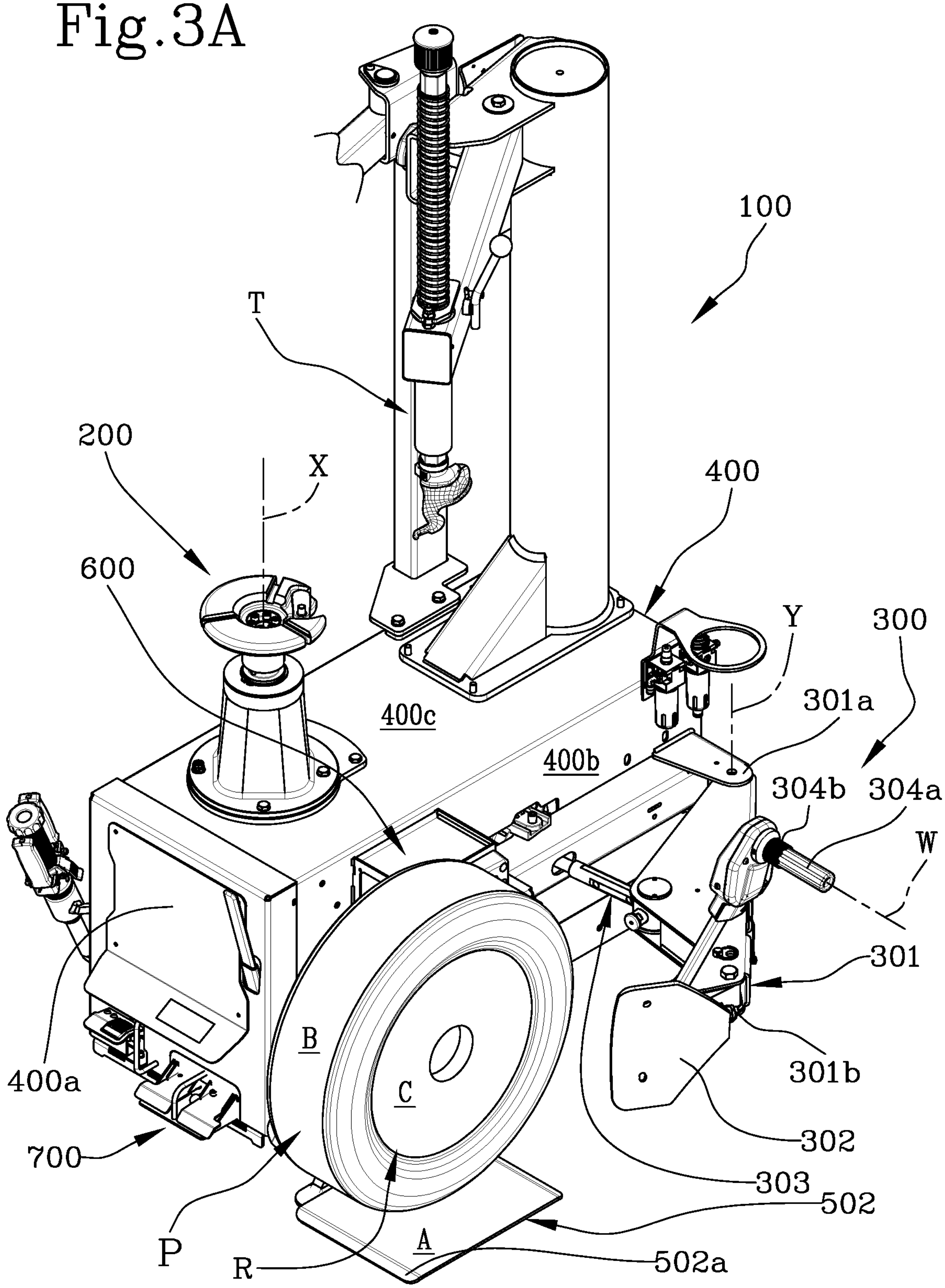
FIGS. 3A and 3B show perspective views of the tyre changing machine in two different operating configurations.
Figure 3B:
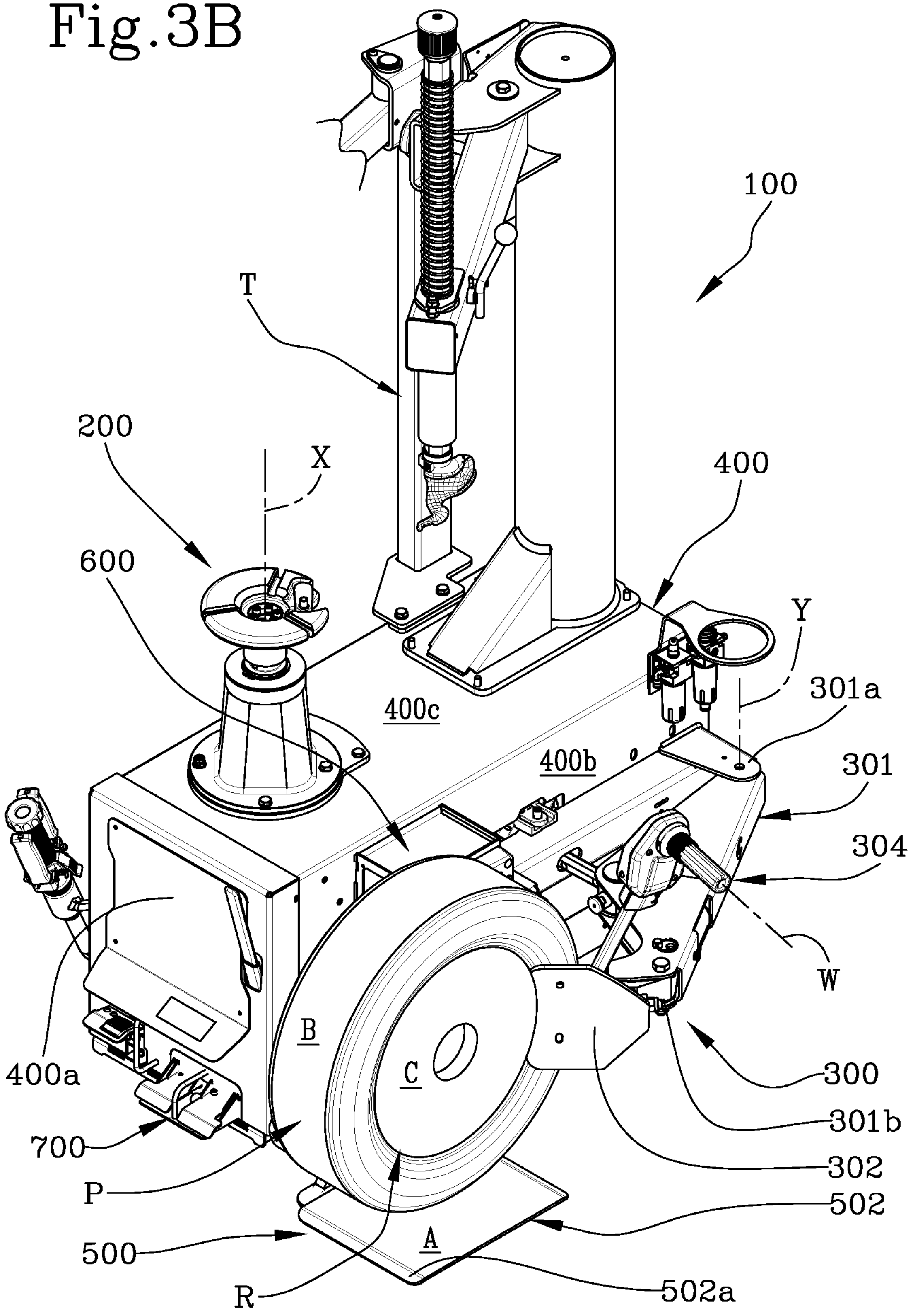

In other words, the bead breaker actuator 303 is configured to cause the bead breaking arm 301 to rotate about the first end 301*a* so as to carry the bead breaker tool 302 towards or away from the wheel R which is suitably positioned against the abutment surface S (FIGS. 3A and 3B).

Looking in more detail, the bead breaker actuator 303 has a first end that is interconnected at a first connecting point inside the frame 400, and a second end that is connectable to the bead breaking arm 301 at a second connecting point.

In an embodiment, the bead breaker actuator 303 has a stem 303*b*, which protrudes through a suitable hole made in the frame 400, and a tubular body 303*a*, which is fixed to the stem 303*b*.

The second connecting point is adjustable so as to define a plurality of connection configurations, corresponding to a plurality of maximum distances between the second connecting point and the first connecting point.

In other words, by adjusting the second connecting point, the maximum distance between the second connecting point and the first connecting point of the bead breaker actuator 303 varies, as does the angle swept by the bead breaking arm 301 when it moves the bead breaker tool 302.

In the embodiment illustrated in the accompanying drawings, the second connecting point is defined by the interconnection, preferably a fit by insertion, between the tubular body 303*a* and a receiving block made on the bead breaking arm 301.

The tubular body 303*a* has a plurality of seats 303*a*', aligned along the length of the bead breaker actuator 303.

Each seat 303*a*' is configured to receive an adjustment element 306.

In this situation, the tubular body 303*a* is inserted into the receiving block which is in turn provided with a seat capable of receiving the adjustment element 306.

In this situation, depending on which seat 303*a*' is aligned with the seat of the receiving block, the maximum distance between the first and the second connecting point differs so that the movement of the bead breaking arm 301 can be adapted based on the size of the wheel R whose rim C must have the tyre P removed from it (FIG. 2B).

In this situation, the adjustment element 306 is useful to switch the bead breaker actuator 303 from one connection configuration to another connection configuration.

In the embodiment illustrated, the adjustment element 306 comprises a coupling pin, configured to define different positions of the first connecting point relative to the second connecting point.

In use, therefore, to detach the bead of the tyre P from the rim C of a wheel R, the wheel is placed in such a way that its sidewall is in contact with the abutment surface S and the tyre tread B rests on the supporting surface A.

Next, the adjustment element 306 is positioned to define a predetermined connection configuration, that is to say, in such a way as to define the maximum distance reachable by the second connecting point relative to the first connecting point.

After that, the bead breaker actuator 303 is activated so as to set the bead breaking arm 301 in rotation about the second axis of rotation Y, that is, about the first end 301*a* of the bead breaking arm 301 itself, thus bringing the bead breaker tool 302 towards the abutment surface S. In this situation, the bead breaker tool 302 comes into contact with the tyre P and is inserted at least partly between the tyre P and the corresponding rim C so as to detach the bead of the tyre P from the annular edge of the rim C.

As shown, for example, in FIG. 3B, when the bead breaker tool 302 is moved close to the wheel R to detach the bead, interference between the bead breaking arm 301 and the tyre P is prevented by the fact that the bead breaking arm 301 comprises a first stretch extending along a substantially horizontal axis and a second stretch that is connected to the first stretch and substantially perpendicular to the first stretch.

More specifically, the second stretch and the first stretch of the bead breaking arm 301 make an angle with each other such that when the bead breaker tool 302 is moved close to the wheel R to perform bead breaking, the wheel R is inside a concavity or arcuate portion defined by the first and the second stretch without interfering with the bead breaking arm 301.

To drive the bead breaker actuator 303, hence the bead breaking arm 301, the tyre changing machine 100 comprises a driving element 304 mounted on the bead breaking arm 301.

In the embodiment illustrated, the driving element 304 is mounted at the end of a supporting rod 307 extending away from the bead breaking arm 301.

According to an aspect of this disclosure, the driving element 304 alternately adopts an advance position, where it drives the bead breaker actuator 303 to move the bead breaker tool 302 towards the abutment surface S, and a return position, where it drives the bead breaker actuator 303 to move the bead breaker tool 302 away from the abutment surface S.

In other words, when the driving element 304 adopts the advance position, the bead breaker actuator 303 moves the bead breaking arm 301 (and the bead breaker tool 302 connected thereto) close to the abutment surface S, hence to the wheel R (FIG. 3B). When the driving element 304 adopts the return position, on the other hand, the bead breaker actuator 303 moves the bead breaking arm 301 (and the bead breaker tool 302 connected thereto) away from the abutment surface S, hence away from the wheel R (FIG. 3A).

The driving element 304 is also configured to adopt an intermediate position, where it stops driving the bead breaker actuator 303 in order to hold the bead breaking arm 301 still.

In other words, at the intermediate position, the driving element 304 keeps the actuator on stand-by so that the latter is neither retracted nor extended and keeps the bead breaking arm 301 (hence the bead breaker tool 302) at the current position.

It is observed that, when the driving element 304 is set in the intermediate position, it keeps the bead breaking arm 301 stationary (and locked) in the current position of the bead breaking arm (i.e. the position in which the bead breaking arm is at the instant in which the actuation element is positioned in the intermediate position). The "current position" of the bead breaking arm 301 can be any position between the end positions of the bead breaking arm (generally speaking, the current position is intermediate between the end positions); the current position is decided by the user, who arrests the breaking arm 301 in the position where the breaking arm 301 is positioned in the instant when the user sets the driving element 304 in the intermediate position.

The fact that the bead breaking arm 301 can be held (stationary and locked) at an intermediate position different from that where it is close to the wheel R or as far as possible from it (and, more in general, any position at the discretion of the user, between the first and second end positions of the bead breaking arm 301), makes detaching the bead quicker, particularly because the user normally processes a plurality of wheels of the same typology (and size) in a row.

Figure 4:
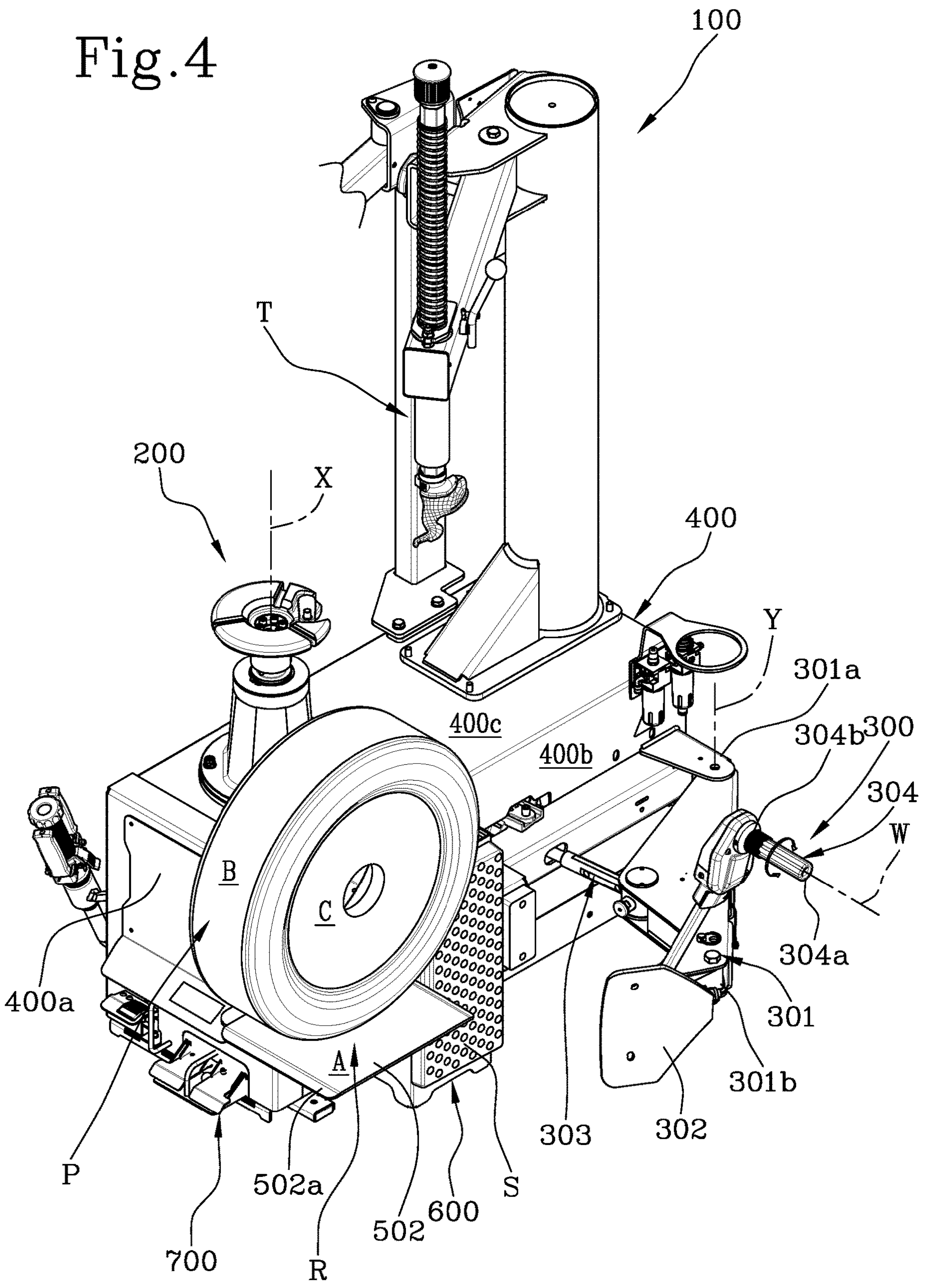
FIG. 4 shows a perspective view of the tyre changing machine during use.

Unlike prior art tyre changing machines 100, where the bead breaking arm 301 was movable between the position close to the wheel (FIG. 3B) and that where it is as far as possible from it (that is, the position occupied by the bead breaking arm 301 when the bead breaker actuator 303 has reached the end of its stroke, FIG. 3A), in the tyre changing machine 100 of this invention, the bead breaking arm 301 can be stopped at any intermediate position (FIG. 4).

In the preferred embodiment, the driving element 304 is rotatable about an axis of rotation W, preferably horizontal, in a first direction, corresponding to the advance position, and in a second direction, opposite of the first direction, corresponding to the return position.

In the embodiment illustrated, the driving element 304 comprises a handle 304*a*, rubber coated, for example, grippable by the operator, and a control ring 304*b* fitted at one end of the handle 304*a* along the axis of rotation W and rotatable according to what is stated above in order to move the bead breaker tool 302.

The tyre changing machine 100 also comprises an elastic return mechanism operating on the driving element 304 to elastically return the driving element 304 to the intermediate position.

In other words, when the driving element 304 (rotated in the first or the second direction) is released, that is to say, when the operator lets go of the driving element 304, the elastic return element takes the driving element 304 back to the intermediate position so it stops driving the bead breaker actuator 303 and holds the bead breaking arm 301 at the current position.

With reference to the embodiment illustrated, when an operator operatively holding the handle 304*a* with one hand to keep the control ring 304*b* at the rotated position, releases the control ring 304*b*, the latter moves back to the intermediate position so that the bead breaker actuator 303 holds the bead breaking arm 301 at the position it had when the control ring 304*b* was released.

In an alternative embodiment, the control ring 304*b* could be integrated in the handle 304*a*. In this situation, to move the bead breaking arm 301, an operator operatively holding the handle 304*a* with one hand rotates the handle to the advance position or the return position.

In use, once the wheel R has been positioned with the sidewall in contact with the abutment surface S and the tyre tread B on the supporting surface A, an operator places one hand operatively on the handle 304*a* and rotates the control ring 304*b* in the first direction.

In this situation, the bead breaker actuator 303 is driven to rotate the bead breaking arm 301 about the first end 301*a* so as to bring the bead breaker tool 302 into contact with the wheel R.

When the bead breaker tool 302 has securely engaged the wheel R, the operator lets go of the handle 304 which, thanks to the elastic return mechanism, moves to the intermediate position. In this situation, the bead breaker actuator 303 is in a stand-by condition to keep the bead breaking arm 301, hence the bead breaker tool 302, at the position reached.

As shown in FIG. 3B, in this situation, the bead breaker tool 302 is inserted between the tyre P and the rim C so as to detach the bead.

Next, the operator rotates the control ring 304*b* in the second direction and the bead breaker actuator 303 is driven to rotate the bead breaking arm 301 about the first end 301*a* so as to move the bead breaker tool 302 away from the wheel R.

While the bead breaker tool 302 is being moved away, and even if the bead breaker actuator 303 has not yet reached the end of its maximum stroke, the operator can release the control ring 304*b* again, and this, thanks to the elastic return mechanism, moves back to the intermediate position and holds the bead breaking arm 301 still. This allows repositioning the wheel R so as to operate on it with the bead breaker tool 302 or replacing it with another wheel R without each time having to take the bead breaker tool 302 back to the maximum distance allowed by the stroke of the bead breaker actuator 303.

As shown in FIG. 2A, the tyre changing machine 100 may also comprise a lifting device 500 including a lifting arm 501.

As shown in FIGS. 1 and 2A, the lifting arm 501 is movable in a plane parallel to the abutment surface S.

This prevents the lifting arm 501 from jutting from the frame 400 and thus reduces the overall dimensions of the tyre changing machine 100.

The lifting device 500 comprises a supporting platform 502 defining a horizontal surface on which to rest the wheel R (FIG. 4).

In the embodiment illustrated, the supporting platform 502 is made in the form of a rigid table provided with at least one guiding portion 502*a* adapted to define a ramp to make it easier to roll the wheel R into position on it.

The supporting platform 502 is substantially in the shape of a rectangle whose long side is disposed parallel to the flank 400*b* of the frame 400.

The supporting platform 502 is connected to the lifting arm 501 and movable between a lowered position, where it can receive the wheel R to be lifted off the floor, and a raised position, where it is lifted to make it easier to place the wheel R on the wheel-holder unit 200.

According to an aspect of this disclosure, the supporting platform 502 is located at a position substantially facing the flank 400*b* of the frame 400. According to an aspect of this disclosure, the supporting platform 502 is hinged to a first end of the lifting arm 501 to rotate about the first end itself.

The lifting arm 501, hence the supporting platform 502, moves in a plane parallel to the flank 400*b* or to the abutment surface S.

The lifting device 500 comprises a connecting rod configured to define, together with the lifting arm 501, a four-bar linkage for keeping the supporting platform 502 parallel to the floor while it is moving from the lowered position to the raised position and vice versa. In this situation, when the wheel R is lifted, there is no risk of the supporting platform 502 tilting and the wheel R falling off.

The lifting device 500 also comprises a lifting actuator connected to the lifting arm 501 to move the supporting platform 502 between the raised position and the lowered position.

In the embodiment illustrated in the accompanying drawings, the lifting actuator is connected to the lifting arm 501 at a hinge point interposed between the first end and a second end of the lifting arm 501. In this situation, the lifting arm 501 is pivoted about the hinge point.

In the embodiment illustrated, the lifting actuator is at least partly positioned in the compartment defined by a box-shaped body 600 operatively coupled to the flank 400*b* of the frame 400 and having a lateral wall that defines the abutment surface S. In this situation, the lifting arm 501 protrudes from one side of the box-shaped body 600 oriented transversely to the abutment surface S. More specifically, the lifting arm 501 protrudes towards a zone in front of the front portion 400*a* of the frame 400.

In other words, the lifting arm 501 is parallel to the flank 400*b* of the frame 400 and protrudes from the box-shaped body 600 at the front portion 400*a*, while the lifting actuator 501 is inserted in the compartment defined by the box-shaped body 600 itself.

In a possible embodiment, the box-shaped body 600 is removably connected to the flank 400*b* of the frame 400 so it can be removed when necessary.

To further facilitate loading the wheel R onto the wheel-holder unit 200, the lifting device 500 comprises an auxiliary platform 503 integral with the lifting arm 501 and configured to define an additional supporting surface for the wheel R.

In the embodiment illustrated, the auxiliary platform 503 extends along the lifting arm 501, parallel to the flank 400*b* of the frame 400.

In the embodiment illustrated, the auxiliary platform 503 is smaller in width than the supporting platform 502.

According to an aspect of this disclosure, the auxiliary platform 503, too, comprises a guiding portion 503*a* that defines a ramp sloping towards the supporting platform 502 and configured to make it easier to move the wheel R towards the wheel-holder unit 200.

In other words, the edge of the auxiliary platform 503 facing the supporting platform 502 is bent towards the supporting platform 502 to define a ramp sloping towards the supporting platform 502 itself.

The auxiliary platform 503 also comprises a stopping portion 503*b* oriented transversely to the lifting arm 501 and configured to act as a mechanical stop for the wheel R.

In a possible embodiment, the stopping portion 503*b* is defined by an edge, specifically an edge of the auxiliary platform 503, facing the box-shaped body 600 and bent to form a wing.

In another possible embodiment, the stopping portion 503*b* is separate from the auxiliary platform 503 and is reversibly mounted thereon.

The tyre changing machine 100 also comprises a plurality of control means.

In the embodiment illustrated, the control means are embodied in the form of pedals 700 protruding from the front portion 400*a* of the frame 400.

At least one of the pedals is configured to activate the lifting actuator for lowering and/or lifting.

In an embodiment, one pedal is configured to activate the lifting actuator for lowering, while another pedal is configured to activate the lifting actuator for lifting.

The plurality of pedals might also comprise a pedal for driving the wheel-holder unit 200 in rotation.

In use, therefore, to lift the wheel R towards the wheel-holder unit 200, an operator rolls the wheel R onto the supporting platform 502.

Next, the operator operates one of the control means to activate the lifting actuator. In this situation, the lifting actuator is configured to position the lifting arm 501 substantially parallel to the floor so that the auxiliary platform 503 is juxtaposed with the supporting platform 502 at the raised position (FIGS. 1 and 4). In this situation, the wheel R placed on the supporting platform 502 is tipped towards the wheel-holder unit 200 with the aid of the guiding portion 503*a*.

More specifically, the wheel R is made to rotate about a vertical axis (perpendicular to the supporting platform 502) so that the tyre tread B faces the guiding portion 503*a* that defines the ramp sloping towards the auxiliary platform 503. Next, the wheel R is made to roll on the guiding portion 503*a* towards the auxiliary platform 503. After that, once the wheel R is on the auxiliary platform 503, the wheel R is again rotated about the vertical axis in such a way as to position it with the rim C parallel to the flank of the frame 400 so it can then be easily tipped over.

This disclosure also relates to a method for using a tyre changing machine 100.

The method comprises a step of providing a tyre changing machine 100 for mounting and demounting a tyre P to and from a corresponding rim C of a vehicle wheel R.

The tyre changing machine 100 comprises a wheel-holder unit 200 rotatable about a first vertical axis of rotation X and configured to support the rim C of the wheel R from which or to which a respective tyre P is to be demounted or mounted, for example, by means of a working head T.

The tyre changing machine 100 also comprises a frame 400 having a front portion 400*a* and a flank 400*b*.

The tyre changing machine 100 also comprises a bead breaker unit 300 mounted on the flank 400*b* of the frame 400 and including an abutment surface S configured to receive a sidewall of the wheel R with the tread B resting on a supporting surface A at floor level.

In other words, the bead breaker unit 300 is a floor mounted unit, where the wheel R rests with one sidewall against the abutment surface S and with the tyre tread B on the floor or on a supporting platform 502. In the latter case, the supporting platform 502 is a horizontal surface for supporting the wheel R in such a way that it does not rest directly on the floor.

The bead breaker unit 300 also comprises a bead breaking arm 301 articulated to the frame 400 to rotate about a second vertical axis Y.

The bead breaking arm 301 comprises a first end 301*a*, articulated to the frame 400, and a second end 301*b*, on which a bead breaker tool 302 is operatively mounted.

The bead breaker tool 302 is paddle shaped so that it can be inserted between the bead of the tyre P and an annular edge of the rim C to detach the bead therefrom.

In the preferred embodiment, the bead breaker tool 302 is rotatable about a vertical adjustment axis Z1 and/or about a horizontal adjustment axis Z2 so as to adapt the position of the bead breaker tool 302 according to the size of the wheel R. In this situation, the method comprises a step of adjusting, in which the bead breaker tool 302 is adjusted about the vertical adjustment axis Z1 and/or about the horizontal adjustment axis Z2.

The bead breaker unit 300 also comprises a bead breaker actuator 303 connected to the bead breaking arm 301 to move the bead breaker tool 302 towards and away from the abutment surface S, so as to detach the bead of the tyre P from the annular edge of the rim C of the wheel R that is in contact with the abutment surface S. The step of detaching the bead is repeated several times on the tyre P at different, angularly spaced points so as to completely detach the bead from the rim C.

The bead breaker actuator 303 is extended and retracted in such a way as to cause the bead breaking arm 301 to rotate about its first end 301*a* to move the bead breaker tool 302 forwards or backwards.

In the preferred embodiment, the maximum distance which the bead breaker tool 302 can reach relative to the wheel R is adjustable. Looking in more detail, the bead breaker actuator 303 comprises a first end that is interconnected at a first connecting point inside the frame 400, in proximity to the abutment surface S, and a second end that is interconnected with the bead breaking arm 301 at a second connecting point.

The second connecting point is adjustable so as to define a plurality of connection configurations, corresponding to a plurality of maximum distances between the second connecting point and the first connecting point.

In other words, by adjusting the second connecting point, the maximum distance between the second connecting point and the first connecting point varies, as does the angle swept by the bead breaking arm 301 when it moves the bead breaker tool 302.

In this situation, the method thus comprises a step of connecting the second end of the bead breaker actuator 303 to the bead breaking arm 301 so as to define a connection configuration corresponding to a maximum distance of the second connecting point from the first connecting point.

To vary the distance reachable by the second connecting point, if necessary, the tyre changing machine 100 comprises an adjustment element 306, preferably a pin, configured to change the possible stroke of the bead breaker actuator 303. In this situation, the method comprises a step of switching the bead breaker actuator 303 from one connection configuration to another by adjusting the second connecting point using the adjustment element 306.

In this situation, the second connecting point is adjusted in such a way that its maximum distance from the first connecting point is different from what it was previously.

The method thus comprises a step of adjusting the stroke of the bead breaker actuator 303, followed by a step of positioning the wheel R whose tyre P is to be removed from the corresponding rim C.

In this step, the wheel R is rested with one sidewall against the abutment surface S, while the tread B may be rested on the floor or on the supporting platform 502 of a lifting device 500, if present, configured to lift the wheel R towards the wheel-holder unit 200.

As shown in FIG. 2A, the bead breaker unit 300 also comprises a driving element 304 connected to the bead breaking arm 301 and configured to drive the bead breaker actuator 303.

According to an aspect of this disclosure, the driving element 304 adopts an advance position, where it drives the bead breaker actuator 303 to move the bead breaker tool 302 towards the abutment surface S.

In this situation, the method comprises a step of positioning the driving element 304 at the advance position.

In the preferred embodiment, the driving element 304 comprises a handle 304*a* grippable by an operator, and a control ring 304*b* at one end of the handle 304*a*. In this situation, the step of positioning corresponds to a step of rotating the control ring 304*b* about an axis of rotation W, preferably horizontal, in a first direction corresponding to the advance position.

Next, the method comprises a step of detaching the bead of the tyre P of the wheel R from the annular edge of the wheel rim C using the bead breaker tool 302.

Once the bead is detached, the method comprises a step of positioning the driving element 304 at a return position, where it drives the bead breaker actuator 303 to move the bead breaker tool 302 away from the abutment surface S.

In the preferred embodiment, since the driving element 304 comprises the handle 304*a* and the control ring 304*b*, the step of positioning corresponds to a step of rotating the control ring 304*b* about the axis of rotation W in a second direction, opposite of the first direction, corresponding to the return position.

In other words, when the driving element 304 adopts the advance position, the bead breaker actuator 303 moves the bead breaking arm 301 (and the bead breaker tool 302 connected thereto) close to the abutment surface S, hence to the wheel R. When the driving element 304 adopts the return position, on the other hand, the bead breaker actuator 303 moves the bead breaking arm 301 (and the bead breaker tool 302 connected thereto) away from the abutment surface S, hence away from the wheel R.

The driving element 304 is also configured to adopt an intermediate position, where it stops driving the bead breaker actuator 303 in order to hold the bead breaking arm 301 still.

In other words, at the intermediate position, the driving element 304 keeps the bead breaker actuator 303 on stand-by so that the latter is neither retracted nor extended and keeps the bead breaking arm 301 (hence the bead breaker tool 302) at the current position.

In this situation, the method may comprise a step of positioning the driving element 304 at an intermediate position, where it stops driving the bead breaker actuator 303 in order to hold the bead breaking arm 301 still. This step may be performed either while the bead breaker tool 302 is being moved towards the wheel, so that after detaching the bead, the bead breaker tool 302 does not damage the tyre P or the rim C, or while the bead breaker tool 302 is being moved away from the wheel, so as to speed up bead breaking operations.

The steps of moving the bead breaker tool 302 are repeated several times until the bead is completely free of the respective rim C.

In a possible embodiment, once the bead is detached from the rim C, the wheel R may be subjected to other operations by other components of the machine 100.

In this situation, the wheel R must be lifted and placed on the supporting plate.

To lift the wheel R towards the wheel-holder unit 200, the tyre changing machine 100 comprises a lifting device 500.

The lifting device 500 includes a lifting arm 501 and a supporting platform 502.

The supporting platform 502 defines a horizontal surface on which to rest the wheel R and is connected to the lifting arm 501 so as to be movable between a lowered position, where it can receive the wheel R to be lifted off the floor, and a raised position, where it is lifted to make it easier to place the wheel R on the wheel-holder unit 200.

In a possible embodiment, during the bead breaking operation, the supporting platform 502 is at the lowered position and, with its sidewall, the wheel R is in contact with the abutment surface S.

In a possible embodiment, during the bead breaking operation, the wheel R rests with the tyre tread B on the supporting platform 502.

Alternatively, after the step of bead breaking, the method comprises a step of placing the wheel R (for example, by rolling it) on the supporting platform 502.

In an embodiment, the method also comprises a step of lifting the wheel R, by rolling the wheel R along the floor and loading the wheel R onto the supporting platform 502 at the lowered position.

In other words, the wheel R is placed on the supporting platform 502, which is then lifted towards the wheel-holder unit 200.

The supporting platform 502 is moved by a lifting actuator connected to the lifting arm 501 to move the supporting platform 502 between the raised position and the lowered position.

In the embodiment illustrated, the lifting actuator is at least partly positioned in the compartment defined by a box-shaped body 600 operatively coupled to the flank **400*b* of the frame 400** and having a lateral wall that defines the abutment surface S.

In this situation, the lifting arm 501 protrudes from one side of the box-shaped body 600 oriented transversely to the abutment surface S. More specifically, the lifting arm 501 protrudes towards a zone in front of the front portion **400*a* of the frame 400**.

Once the wheel R has been lifted, it is placed on and secured to the wheel-holder unit 200 which is set in rotation.

In the embodiment illustrated, the lifting device 500 comprises an auxiliary platform 503 integral with the lifting arm 501 and configured to define an additional supporting surface for the wheel R. In this situation, the method comprises a step, performed by the lifting actuator, of positioning the lifting arm 501 substantially parallel to the floor and the auxiliary platform 503 juxtaposed with the supporting platform 502, with the supporting platform 502 at the raised position. In this situation, the method comprises a step of rotating the wheel R about a vertical axis (perpendicular to the supporting platform 502) so that the tyre tread B faces the auxiliary platform 503, and a step of rolling the wheel R along the guiding portion **503*a* to position the wheel R on the auxiliary platform 503. Next, the method comprises a further step of rotating the wheel R about the vertical axis to bring the rim C back to being parallel to the flank of the frame 400 and tilt the wheel R towards the wheel-holder unit 200**.

After tipping, the wheel-holder unit 200 is activated.

In the embodiment illustrated, the tyre changing machine 100 comprises a plurality of control means, for example, pedals 700, protruding from the front portion **400*b* of the frame 400**.

In this situation, the step of lifting the supporting platform 502 to facilitate placing the wheel R on the wheel-holder unit 200, the step of lowering the supporting platform 502 to receive the wheel R from the floor and the step of setting the wheel-holder unit 200 in rotation are performed by means of one or more of the plurality of control means.

This invention achieves the preset aims and overcomes the disadvantages of the prior art.

In particular, the tyre changing machine 100 of this disclosure is more ergonomic, quick and easy to use and versatile in handling wheels of different sizes.

Advantageously, the possibility of releasing the driving element 304 at an intermediate position so that the bead breaker actuator 303 holds the bead breaker tool 302 at a desired position allows reducing the time needed for bead breaking operations.

Advantageously, the possibility of performing a double adjustment of the bead breaker tool 302 makes the tyre changing machine 100 versatile and easy to adapt to wheels R of different sizes.

Advantageously, positioning the driving element 304 gives greater control of the bead breaker tool 302 without having to use a pedal control unit.

Advantageously, the presence of the box-shaped body 600 in which the lifting actuator is inserted and thus the positioning of the lifting arm 501 allow reducing the overall dimensions of the tyre changing machine 100, making it more compact but, at the same time, ergonomic.

Advantageously, the fact that the box-shaped body 600 may be removable from the frame 400 allows further reducing the dimensions of the tyre changing machine 100 when the lifting device 500 is temporarily removed.

In an example, the (bead breaker unit 300 of the) tyre changing machine 100 includes a nozzle 308, configured for spraying a lubricant fluid. The tyre changing machine 100 includes a reservoir of lubricant fluid, the nozzle being in fluid communication with said reservoir. The nozzle 308 is supported on the bead breaking arm 301 (for example, in proximity to the bead breaking tool 302), so that the nozzle 308 can spray the lubricant fluid on a bead of the tyre P, in particular in the region where the tyre abuts of the rim flange. Operatively, the nozzle 308 sprays the lubricant fluid on a bead of the tyre P when the bead breaking arm 301 is in a position close or approached to the wheel arranged at the abirment surface.

Moreover, the driving element 304 includes a spraying command **304*c*, connected to the nozzle 308 for commanding the spraying of the lubricant fluid responsive to an activation by the user of the spraying command 304*c***.

The spraying command **304*c* may be provided as a separate command (for example a button) with respect to the control ring 304*b*; alternatively the spraying command 304*c*** may be integrated in the control ring 304*b*. Preferably, the spraying command 304*c* is positioned in proximity to the handle 304*a*, for example at the at one end of the handle 304*a*, so that the spraying command 304*c* can be activated by the user with the same hand that holds (grips) the handle 304*a*.

Likewise, the method for using a tyre changing machine may comprise a lubricating step, wherein a lubricant fluid is sprayed on a bead of the tyre P through a nozzle 308 mounted on the bead breaking arm 301. Preferably, the nozzle 308 sprays the lubricant responsive to an activation of the spraying command 304*c*, which can be managed manually by the user by means of the hand gripping the knob 304*a*.

The invention claimed is:

1. A tyre changing machine for mounting and demounting a tyre to and from a corresponding rim of a vehicle wheel, comprising:

a wheel-holder unit rotatable about a first vertical axis of rotation and configured to support the rim of the wheel from which or to which a respective tyre is to be demounted or mounted;

a frame which rests on a floor and which has a front portion and a flank;

a bead breaker unit, mounted on the flank of the frame and connected thereto and including:

an abutment surface configured to receive the wheel with the tread resting on a supporting surface at floor level and a sidewall abutted against the abutment surface, a bead breaking arm articulated to the frame to rotate about a second vertical axis, a paddle shaped bead breaker tool mounted on the bead breaking arm, a bead breaker actuator connected to the bead breaking arm to move the bead breaker tool towards and away from the abutment surface, so as to detach the bead of the tyre from an annular edge of the rim of the wheel that is in contact with the abutment surface and rests on the supporting surface, and a driving element, mounted on the bead breaking arm and configured to drive the bead breaker actuator, the driving element alternately adopting an advance position, where it drives the bead breaker actuator to move the bead breaker tool towards the abutment surface, and a return position, where it drives the bead breaker actuator to move the bead breaker tool away from the abutment surface, wherein the driving element is configured to adopt an intermediate position, where it stops driving the bead breaker actuator in order to hold the bead breaking arm still, and wherein the driving element comprises a handle grippable by an operator, and a control ring at one end of the handle and rotatable about an axis of rotation, the control ring being rotatable in a first direction corresponding to the advance position and in a second direction, opposite of the first direction, corresponding to the return position.

2. The tyre changing machine according to claim 1, comprising an elastic return mechanism operating on the driving element to elastically return the driving element to the intermediate position.

3. The tyre changing machine according to claim 1, wherein the bead breaker actuator is controlled by a five-way valve with three positions corresponding, respectively, to the advance position, the return position and the intermediate position of the driving element.

4. The tyre changing machine according to claim 1, comprising a lifting device, including:

a lifting arm, a supporting platform, defining a horizontal supporting surface on which to rest the wheel, connected to the lifting arm and movable between a lowered position, where it can receive the wheel (R) to be lifted off the floor, and a raised position, where it is lifted to make it easier to place the wheel on the wheel-holder unit, and a lifting actuator, connected to the lifting arm to move the supporting platform between the raised position and the lowered position.

5. The tyre changing machine according to claim 1, wherein:

the bead breaker unit includes a nozzle, configured for spraying a lubricant fluid and supported on the bead breaking arm, so that the nozzle can spray the lubricant fluid on a bead of the tyre;

the driving element includes a spraying command, connected to the nozzle for commanding the spraying of the lubricant fluid responsive to an activation by the user of the spraying command.

6. A tyre changing machine for mounting and demounting a tyre to and from a corresponding rim of a vehicle wheel, comprising:

a wheel-holder unit rotatable about a first vertical axis of rotation and configured to support the rim of the wheel from which or to which a respective tyre is to be demounted or mounted;

a frame which rests on a floor and which has a front portion and a flank;

a bead breaker unit, mounted on the flank of the frame and connected thereto and including:

an abutment surface configured to receive the wheel with the tread resting on a supporting surface at floor level and a sidewall abutted against the abutment surface, a bead breaking arm articulated to the frame to rotate about a second vertical axis, a paddle shaped bead breaker tool mounted on the bead breaking arm, a bead breaker actuator connected to the bead breaking arm to move the bead breaker tool towards and away from the abutment surface, so as to detach the bead of the tyre from an annular edge of the rim of the wheel that is in contact with the abutment surface and rests on the supporting surface, and a driving element, mounted on the bead breaking arm and configured to drive the bead breaker actuator, the driving element alternately adopting an advance position, where it drives the bead breaker actuator to move the bead breaker tool towards the abutment surface, and a return position, where it drives the bead breaker actuator to move the bead breaker tool away from the abutment surface, wherein the driving element is also configured to adopt an intermediate position, where it stops driving the bead breaker actuator in order to hold the bead breaking arm still and wherein the bead breaker actuator has a first end that is interconnected at a first connecting point inside the frame, and a second end that is connectable to the bead breaking arm at a second, adjustable connecting point so as to define a plurality of connection configurations, corresponding to a plurality of maximum distances between the first connecting point and the second connecting point, the tyre changing machine comprising an adjustment element to switch the bead breaker actuator from one connection configuration to another connection configuration.

7. The tyre changing machine according to claim 6, wherein the adjustment element comprises a coupling pin, configured to define different positions of the first connecting point relative to the second connecting point.

8. The tyre changing machine according to claim 6, wherein the bead breaking arm comprises a first stretch extending along an axis and a second stretch that is connected to the first stretch and substantially perpendicular to the first stretch, so as not to interfere with the tyre.

9. The tyre changing machine according to claim 6, comprising a lifting device, including:

a lifting arm, a supporting platform, defining a horizontal supporting surface on which to rest the wheel, connected to the lifting arm and movable between a lowered position, where it can receive the wheel (R) to be lifted off the floor, and a raised position, where it is lifted to make it easier to place the wheel on the wheel-holder unit, and a lifting actuator, connected to the lifting arm to move the supporting platform between the raised position and the lowered position.

10. The tyre changing machine according to claim 9, comprising a box-shaped body having a lateral wall defining the abutment surface and internally defining a compartment, wherein the lifting actuator is at least partly positioned in the compartment in the box-shaped body.

11. The tyre changing machine according to claim 6, wherein:

the bead breaker unit includes a nozzle, configured for spraying a lubricant fluid and supported on the bead breaking arm, so that the nozzle can spray the lubricant fluid on a bead of the tyre;

the driving element includes a spraying command, connected to the nozzle for commanding the spraying of the lubricant fluid responsive to an activation by the user of the spraying command.

12. A tyre changing machine for mounting and demounting a tyre to and from a corresponding rim of a vehicle wheel, comprising:

a wheel-holder unit rotatable about a first vertical axis of rotation and configured to support the rim of the wheel from which or to which a respective tyre is to be demounted or mounted;

a frame which rests on a floor and which has a front portion and a flank;

a bead breaker unit, mounted on the flank of the frame and connected thereto and including:

an abutment surface configured to receive the wheel with the tread resting on a supporting surface at floor level and a sidewall abutted against the abutment surface, a bead breaking arm articulated to the frame to rotate about a second vertical axis, a paddle shaped bead breaker tool mounted on the bead breaking arm, a bead breaker actuator connected to the bead breaking arm to move the bead breaker tool towards and away from the abutment surface, so as to detach the bead of the tyre from an annular edge of the rim of the wheel that is in contact with the abutment surface and rests on the supporting surface, and a driving element, mounted on the bead breaking arm and configured to drive the bead breaker actuator, the driving element alternately adopting an advance position, where it drives the bead breaker actuator to move the bead breaker tool towards the abutment surface, and a return position, where it drives the bead breaker actuator to move the bead breaker tool away from the abutment surface, wherein the driving element is also configured to adopt an intermediate position, where it stops driving the bead breaker actuator in order to hold the bead breaking arm still, and wherein the bead breaker tool is configured to rotate about a vertical adjustment axis.

13. A tyre changing machine for mounting and demounting a tyre to and from a corresponding rim of a vehicle wheel, comprising:

a wheel-holder unit rotatable about a first vertical axis of rotation and configured to support the rim of the wheel from which or to which a respective tyre is to be demounted or mounted;

a frame which rests on a floor and which has a front portion and a flank;

a bead breaker unit, mounted on the flank of the frame and connected thereto and including:

an abutment surface configured to receive the wheel with the tread resting on a supporting surface at floor level and a sidewall abutted against the abutment surface, a bead breaking arm articulated to the frame to rotate about a second vertical axis, a paddle shaped bead breaker tool mounted on the bead breaking arm, a bead breaker actuator connected to the bead breaking arm to move the bead breaker tool towards and away from the abutment surface, so as to detach the bead of the tyre from an annular edge of the rim of the wheel that is in contact with the abutment surface and rests on the supporting surface, and a driving element, mounted on the bead breaking arm and configured to drive the bead breaker actuator, the driving element alternately adopting an advance position, where it drives the bead breaker actuator to move the bead breaker tool towards the abutment surface, and a return position, where it drives the bead breaker actuator to move the bead breaker tool away from the abutment surface, wherein the driving element is also configured to adopt an intermediate position, where it stops driving the bead breaker actuator in order to hold the bead breaking arm still, and wherein the bead breaker tool is configured to rotate about a horizontal adjustment axis.

14. A method for using a tyre changing machine, comprising the following steps:

providing a tyre changing machine for mounting and demounting a tyre to and from a corresponding rim of a vehicle wheel, comprising:

a wheel-holder unit rotatable about a first vertical axis of rotation and configured to support the rim of the wheel from which or to which a respective tyre is to be demounted or mounted;

a frame having a front portion and a flank;

a bead breaker unit, mounted on the flank of the frame and including an abutment surface, configured to receive a sidewall of the wheel with the tread resting on a supporting surface at floor level, a bead breaking arm articulated to the frame to rotate about a second vertical axis, a paddle shaped bead breaker tool mounted on the bead breaking arm, a bead breaker actuator, connected to the bead breaking arm to move the bead breaker tool towards and away from the abutment surface, so as to detach the bead of the tyre from an annular edge of the rim of the wheel that is in contact with the abutment surface, and a driving element, connected to the bead breaking arm and configured to drive the bead breaker actuator;

positioning a wheel of a vehicle whose tyre is to be demounted from a corresponding rim;

positioning the driving element at an advance position, where it drives the bead breaker actuator to move the bead breaker tool towards the abutment surface;

detaching the bead of the tyre of the wheel from the annular edge of the rim of the wheel using the bead breaker tool;

positioning the driving element at a return position, where it drives the bead breaker actuator to move the bead breaker tool away from the abutment surface;

positioning the driving element at an intermediate position, where it stops driving the bead breaker actuator in order to hold the bead breaking arm still, wherein the driving element comprises, on the bead breaking arm, a handle grippable by an operator, and a control ring at one end of the handle, the method comprising a step of rotating the control ring about an axis of rotation in a first direction corresponding to the advance position and a step of rotating the control ring in a second direction, opposite of the first direction, corresponding to the return position.

15. A method for using a tyre changing machine, comprising the following steps:

providing a tyre changing machine for mounting and demounting a tyre to and from a corresponding rim of a vehicle wheel, comprising:

a wheel-holder unit rotatable about a first vertical axis of rotation and configured to support the rim of the wheel from which or to which a respective tyre is to be demounted or mounted;

a frame having a front portion and a flank;

a bead breaker unit, mounted on the flank of the frame and including an abutment surface, configured to receive a sidewall of the wheel with the tread resting on a supporting surface at floor level, a bead breaking arm articulated to the frame to rotate about a second vertical axis, a paddle shaped bead breaker tool mounted on the bead breaking arm, a bead breaker actuator, connected to the bead breaking arm to move the bead breaker tool towards and away from the abutment surface, so as to detach the bead of the tyre from an annular edge of the rim of the wheel that is in contact with the abutment surface, and a driving element, connected to the bead breaking arm and configured to drive the bead breaker actuator;

positioning a wheel of a vehicle whose tyre is to be demounted from a corresponding rim;

positioning the driving element at an advance position, where it drives the bead breaker actuator to move the bead breaker tool towards the abutment surface;

detaching the bead of the tyre of the wheel from the annular edge of the rim of the wheel using the bead breaker tool;

positioning the driving element at a return position, where it drives the bead breaker actuator to move the bead breaker tool away from the abutment surface;

positioning the driving element at an intermediate position, where it stops driving the bead breaker actuator in order to hold the bead breaking arm still, wherein the tyre changing machine comprises:

a plurality of control means;

a lifting device including a lifting arm and a supporting platform, defining a horizontal surface on which to rest the wheel and connected to the lifting arm;

and wherein the method comprises a step of lifting the supporting platform to facilitate placing the wheel on the wheel-holder unit and a step of setting the wheel-holder unit in rotation, these steps being performed by means of one or more of the plurality of control means.

16. The method according to claim 15, comprising a lubricating step, wherein a lubricant fluid is sprayed on a bead of the tyre by a nozzle mounted to the bead breaking arm, responsive to an activation of a spraying command included in the driving element, by the user who handles the driving element.

17. A method for using a tyre changing machine, comprising the following steps:

providing a tyre changing machine for mounting and demounting a tyre to and from a corresponding rim of a vehicle wheel, comprising:

a wheel-holder unit rotatable about a first vertical axis of rotation and configured to support the rim of the wheel from which or to which a respective tyre is to be demounted or mounted;

a frame having a front portion and a flank;

a bead breaker unit, mounted on the flank of the frame and including an abutment surface, configured to receive a sidewall of the wheel with the tread resting on a supporting surface at floor level, a bead breaking arm articulated to the frame to rotate about a second vertical axis, a paddle shaped bead breaker tool mounted on the bead breaking arm, a bead breaker actuator, connected to the bead breaking arm to move the bead breaker tool towards and away from the abutment surface, so as to detach the bead of the tyre from an annular edge of the rim of the wheel that is in contact with the abutment surface, and a driving element, connected to the bead breaking arm and configured to drive the bead breaker actuator;

positioning a wheel of a vehicle whose tyre is to be demounted from a corresponding rim;

positioning the driving element at an advance position, where it drives the bead breaker actuator to move the bead breaker tool towards the abutment surface;

detaching the bead of the tyre of the wheel from the annular edge of the rim of the wheel using the bead breaker tool;

positioning the driving element at a return position, where it drives the bead breaker actuator to move the bead breaker tool away from the abutment surface;

positioning the driving element at an intermediate position, where it stops driving the bead breaker actuator in order to hold the bead breaking arm still, wherein the bead breaker actuator has a first end that is interconnected with the frame at a first connecting point, and a second end that is connectable to the bead breaking arm at a second, adjustable connecting point so as to define a plurality of different positions of the second end of the bead breaker actuator, and wherein the tyre changing machine comprises an adjustment element, the method further comprising the following steps:

connecting the second end of the bead breaker actuator to the second connecting point so as to define a connection configuration corresponding to a maximum distance between the first connecting point and the second connecting point;

switching the bead breaker actuator from a first connection configuration to a second connection configuration by adjusting the second connecting point using the adjustment element.

18. The method according to claim 17, comprising a lubricating step, wherein a lubricant fluid is sprayed on a bead of the tyre by a nozzle mounted to the bead breaking arm, responsive to an activation of a spraying command included in the driving element, by the user who handles the driving element.

19. A tyre changing machine for mounting and demounting a tyre to and from a corresponding rim of a vehicle wheel, comprising:

a wheel-holder unit rotatable about a first vertical axis of rotation and configured to support the rim of the wheel from which or to which a respective tyre is to be demounted or mounted;

a frame which rests on a floor and which has a front portion and a flank;

a bead breaker unit, mounted on the flank of the frame and connected thereto and including:

an abutment surface configured to receive the wheel with the tread resting on a supporting surface at floor level and a sidewall abutted against the abutment surface, a bead breaking arm, articulated to the frame to rotate about a second vertical axis, a paddle shaped bead breaker tool mounted on the bead breaking arm, a bead breaker actuator, connected to the bead breaking arm to move the bead breaking arm towards a first end position, proximal to the abutment surface, and towards a second end position, opposite the first end position and distal from the abutment surface, whereby the bead breaker tool moves towards and away from the abutment surface, respectively, so as to detach the bead of the tyre from an annular edge of the rim of the wheel that is in contact with the abutment surface and rests on the supporting surface, and a driving element, mounted on the bead breaking arm and configured to drive the bead breaker actuator, the driving element being manually commutable among a plurality of working positions, the plurality of working positions including:

an advance position, where it drives the bead breaker actuator to move the bead breaker tool towards the abutment surface, an intermediate position, where it stops driving the bead breaker actuator in order to hold the bead breaking arm stationary, wherein the driving element comprises a handle grippable by an operator, and a command component, located at the handle, the command component being connected to the driving element for commuting the driving element among the working positions of the plurality of working positions.

20. The tyre changing machine of claim 19, wherein the driving element is further commutable in a return position, where it drives the bead breaker actuator to move the bead breaker tool away from the abutment surface.

* * * * *